(12) United States Patent
Ferrari et al.

(10) Patent No.: US 10,343,570 B1
(45) Date of Patent: Jul. 9, 2019

(54) VEHICLE ARMREST MOUNTING ASSEMBLY AND INSTALLATION METHOD

(71) Applicant: Lear Corporation, Southfield, MI (US)

(72) Inventors: Michael Ferrari, St. Clair Shores, MI (US); Rahul Gadkari, Pune (IN); Mangesh Mahadik, Pune (IN); Nilesh Mahajan, Pune (IN); Asif Shaikh, Pune (IN); Sharad Surwase, Pune (IN)

(73) Assignee: Lear Corporation, Southfield, MI (US)

( * ) Notice: Subject to any disclaimer, the term of this patent is extended or adjusted under 35 U.S.C. 154(b) by 6 days.

(21) Appl. No.: 15/843,800

(22) Filed: Dec. 15, 2017

(51) Int. Cl.
*A47C 13/00* (2006.01)
*B60N 2/75* (2018.01)
*B60N 2/68* (2006.01)

(52) U.S. Cl.
CPC .......... *B60N 2/757* (2018.02); *B60N 2/682* (2013.01)

(58) Field of Classification Search
CPC ........ B60N 2/757; B60N 2/793; B60N 2/753; B60N 2/79
See application file for complete search history.

(56) References Cited

U.S. PATENT DOCUMENTS

| | | | | |
|---|---|---|---|---|
| 4,435,011 A | * | 3/1984 | Hakamata | B60N 2/757 297/113 |
| 4,668,010 A | * | 5/1987 | Fujiwara | B60N 2/79 297/150 |
| 4,759,583 A | * | 7/1988 | Schrom | B60N 2/757 297/113 |
| 5,292,171 A | * | 3/1994 | Harrell | B60N 2/757 297/113 |
| 5,342,115 A | * | 8/1994 | De Filippo | B60N 2/753 297/411.32 |
| 5,352,012 A | * | 10/1994 | Chowdhury | B60N 2/757 297/113 |
| 5,669,107 A | * | 9/1997 | Carlsen | E05D 11/082 16/348 |
| 5,752,739 A | * | 5/1998 | Saeki | B60N 2/757 297/113 |
| 6,047,444 A | * | 4/2000 | Braun | E05D 11/1007 16/324 |
| 6,328,384 B1 | * | 12/2001 | Yamauchi | B60N 2/753 297/411.29 |
| 6,386,629 B1 | * | 5/2002 | Severinski | B60N 2/3011 297/188.1 |
| 7,178,865 B2 | * | 2/2007 | Yetukuri | B60N 2/757 297/113 |

(Continued)

FOREIGN PATENT DOCUMENTS

DE 19811523 A1 9/1999
DE 102005033020 A1 6/2007

*Primary Examiner* — Shin H Kim
(74) *Attorney, Agent, or Firm* — MacMillan, Sobanski & Todd, LLC (57) ABSTRACT

An armrest mounted in a seat assembly includes an armrest mounting assembly. The mounting assembly supports the armrest and is adapted to provide rotation of the armrest between a stowed and use position. The mounting assembly includes a bracket supporting a mounting plate having a stop rod rotation channel, a pivot rod installation aperture, a retention tab, and a pivot cradle. The pivot rod has an end portion shaped to engage the mounting plate. The armrest mounting assembly provides an efficient securing mechanism for a pivoting armrest.

18 Claims, 10 Drawing Sheets

(56) References Cited

U.S. PATENT DOCUMENTS

| | | | | |
|---|---|---|---|---|
| 8,016,359 B2* | 9/2011 | Dillinger | ............... | B60N 2/753 |
| | | | | 297/411.32 |
| 8,371,654 B2* | 2/2013 | Senges | ................... | B60N 2/757 |
| | | | | 297/411.32 |
| 8,789,881 B2* | 7/2014 | von Rothkirch und Panthen | ....... | |
| | | | | B60N 2/77 |
| | | | | 297/113 |
| 9,022,328 B2* | 5/2015 | Mayer | .................... | B60N 2/753 |
| | | | | 248/118 |
| 9,022,463 B2* | 5/2015 | Cha | ........................ | B60N 2/757 |
| | | | | 297/113 |
| 10,131,258 B2* | 11/2018 | Akai | ...................... | B60N 2/682 |
| 2012/0223564 A1* | 9/2012 | Andersson | ............. | B60N 2/787 |
| | | | | 297/411.3 |
| 2015/0115682 A1* | 4/2015 | Mangold | ............... | B60N 2/753 |
| | | | | 297/411.21 |

* cited by examiner

VEHICLE ARMREST MOUNTING ASSEMBLY AND INSTALLATION METHOD

BACKGROUND OF THE INVENTION

This invention relates to a vehicle seat back that includes a moveable armrest. More specifically, this invention relates to installation and support of a pivotable armrest.

Many vehicles include seats having one or more armrests for the comfort of passengers. For example, a vehicular bench seat may include a center armrest for shared use by passengers on either side. Many armrests are moveable between a use position and a stowed position. Typically, an armrest may be moved between the two positions by pivoting it relative to the seat. Thus, the center armrest on the bench seat may be positioned in the use position, where it is available for use by adjacent passengers, or it may be located in the stowed position, where the armrest is nested in a seat back so that an additional passenger may occupy the center of the bench seat.

It is desirable that the armrest is comfortable for the passengers and is adapted to attach securely with using structures and methods that are simple and efficient. It would be advantageous to have improved structures for connecting a pivoting armrest to a seat back.

SUMMARY OF THE INVENTION

This invention relates to structures for mounting and supporting an armrest in a seat assembly, vehicle seat assemblies with armrests, and methods of installing an armrest.

The seat assembly includes an armrest that is mounted for rotational movement about an armrest axis relative to the seat back between a stowed position and a use position. The seat assembly has a back frame; an armrest having a pivot rod and a stop rod; and an armrest mounting assembly attaching the armrest to the back frame such that the armrest pivots relative to the back frame. The armrest mounting assembly includes a first mounting plate secured to the frame, having a keyhole with a width wider than a tip of the pivot rot, a retention tab adjacent the keyhole and configured to move between a release position and a retention position, a pivot cradle at the lower edge of the keyhole configured to engage the pivot rod and permit rotation of the pivot rod relative to the first mounting plate, and a stop rod rotation channel configured to engage the stop rod and permit movement of the stop rod along an arc defined by the rotation channel; and includes a second mounting plate secured to the frame, having a pivot hole configured to engage the pivot rod, and a second stop rod rotation channel configured to engage the stop rod. The described mounting assembly is lightweight, durable, and facilitates mounting the armrest relative to the seat without the use of tools or fasteners during the installation.

Various aspects of this invention will become apparent to those skilled in the art from the following detailed description of the exemplary and preferred embodiments, when read in light of the accompanying drawings.

Exemplary features and embodiments are illustrated in referenced figures of the drawings, in which the same references numbers are used in the figures for identical or analogous elements. It is intended that the embodiments and figures disclosed herein are to be considered illustrative rather than limiting.

DETAILED DESCRIPTION OF THE PREFERRED EMBODIMENT

Figure 1:
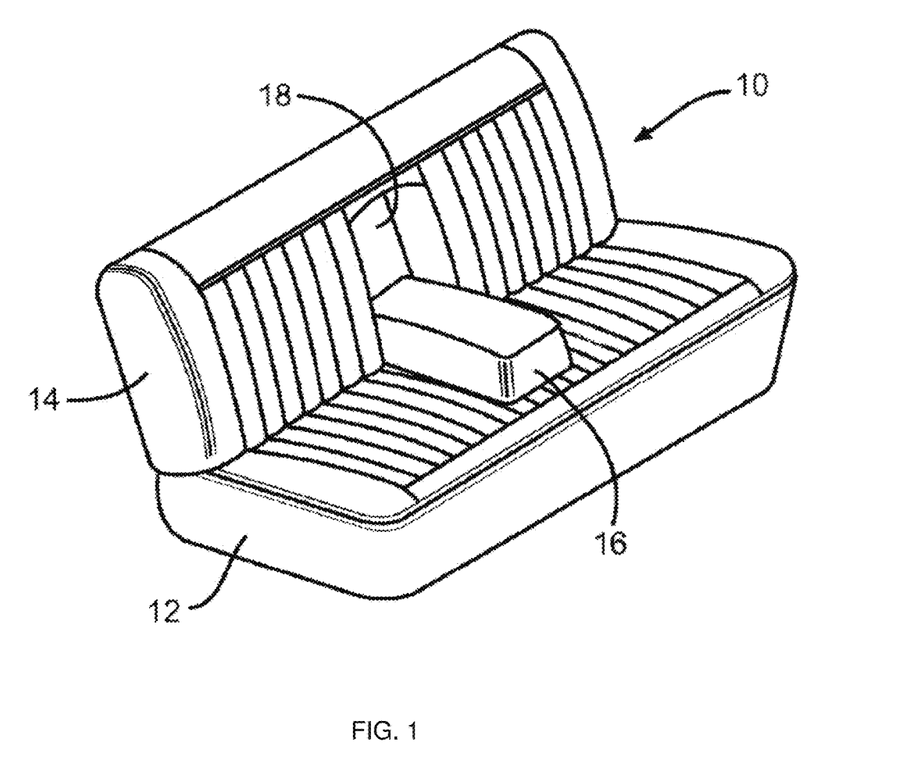
FIG. 1 is a perspective view of a bench seat including an armrest.

Referring now to the drawings, there is illustrated in FIG. 1 a perspective view of a seat assembly. The illustrated bench seat 10 is a type commonly installed in the back seat of passenger vehicles. The bench seat 10 includes a seat portion 12 and a back rest 14. The seat portion 12 and the back rest 14 are typically cushioned and upholstered for aesthetics and the comfort of seat occupants. The seat portion 12 and the back rest 14 may be upholstered with leather, fabric, or other desired materials.

An armrest 16 is located substantially in the middle of the bench seat 10. The armrest 16 is able to be pivoted between a use position and a stowed position. The armrest 16 is shown in the use position in FIG. 1. An armrest stowage space 18 is provided in the backrest 14 and is sized to accommodate the armrest 16. The armrest 16 may be pivoted into the stowage space 18. The armrest 16 will generally be cushioned and upholstered for aesthetics and the comfort of the occupants. The armrest 16 may be upholstered with materials to complement the appearance of the bench seat 10. The armrest 16 may also include features such as storage compartments and cup holders. It should be appreciated that the bench seat 10 is used for illustrative purposes only as a seat suitable for the armrest described in herein. The bench seat 10 is not intended to be limiting on where the armrest may be used.

Figure 2:
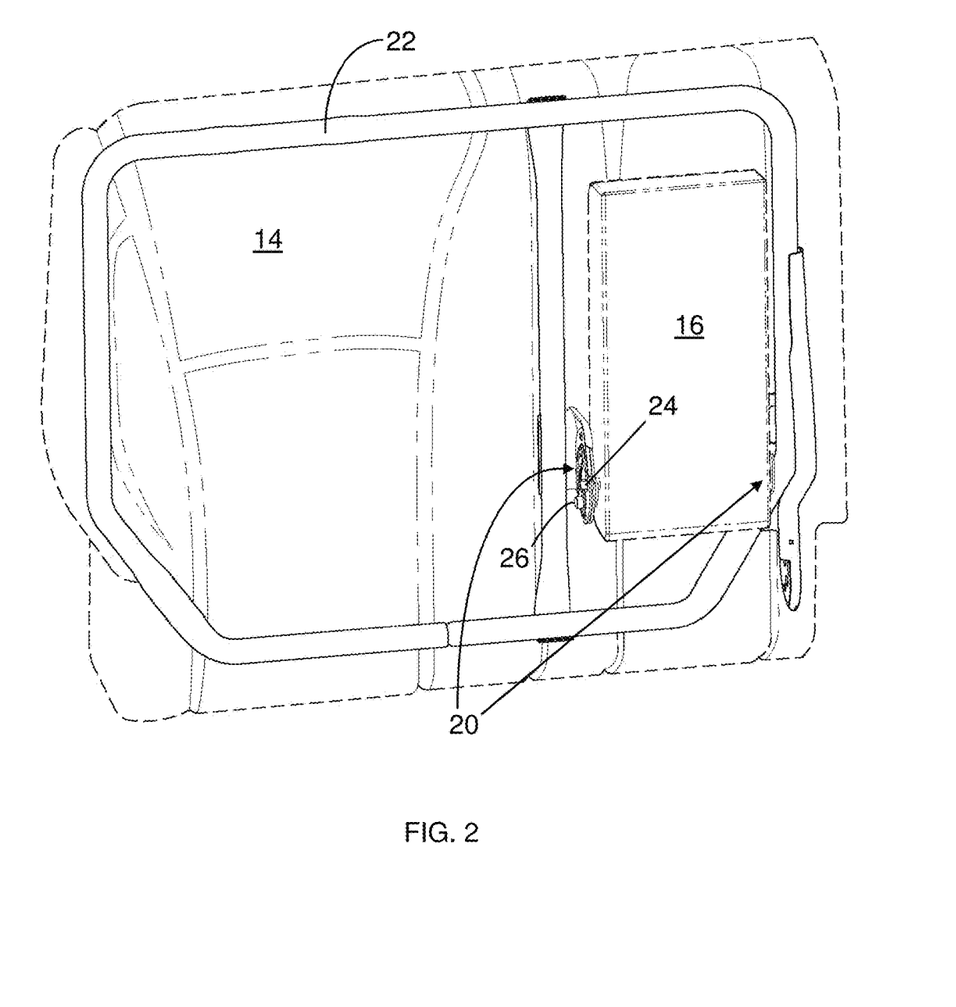
FIG. 2 is a perspective cut-away view of a portion of the bench seat and armrest, showing a mounting assembly for the armrest on a back frame.

Referring now to FIG. 2, a perspective view of the back rest 14 is shown having the conventional foam and trim components removed or shown semitransparent so that a seat back frame 22, is visible. The back frame 22 supports a mounting assembly, indicated generally at 20, for attaching the armrest 16 relative to the back frame 22 of the bench seat 10. The mounting assembly 20 is shown fixed relative to the back frame and engaging a pivot rod 24 that is fixed relative to the armrest 16 and engaging a stop rod 26 fixed relative to the pivot rod 24. It should be appreciated that while the stop rod 26 and the pivot rod 24 are shown extending completely through the armrest 16, there could be separate shaft sections located on opposite sides of the armrest 16. It should also be appreciated that the mounting assembly 20 may be mounted relative to the seat portion 12 or some other component rather than directly mounting on the back frame 22. Further, it should be appreciated that the mounting assembly 20 may be mounted relative to the armrest 16 and the pivot rod 24 may be mounted relative to the seat 10.

Figure 3:
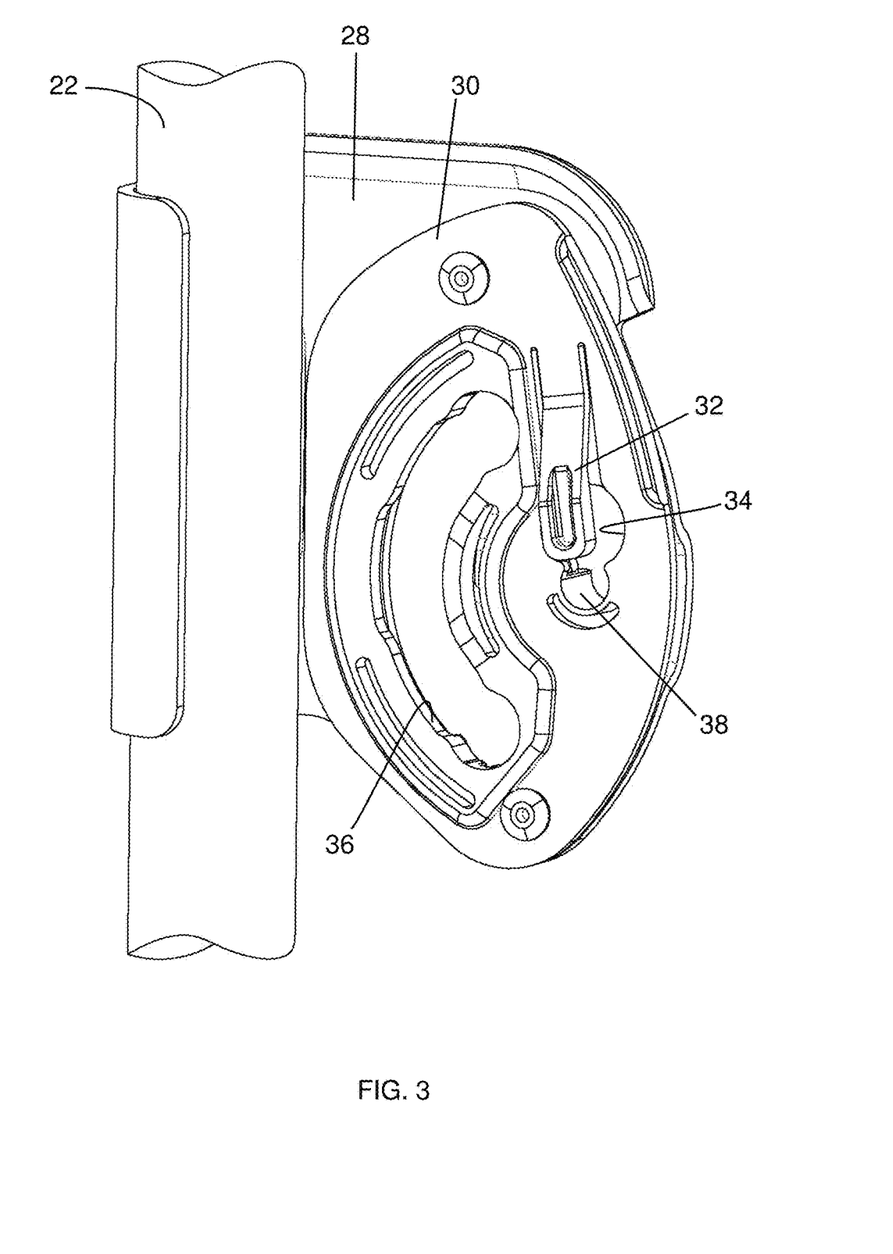
FIG. 3 shows a perspective view of a first side of the mounting assembly.
Figure 4:
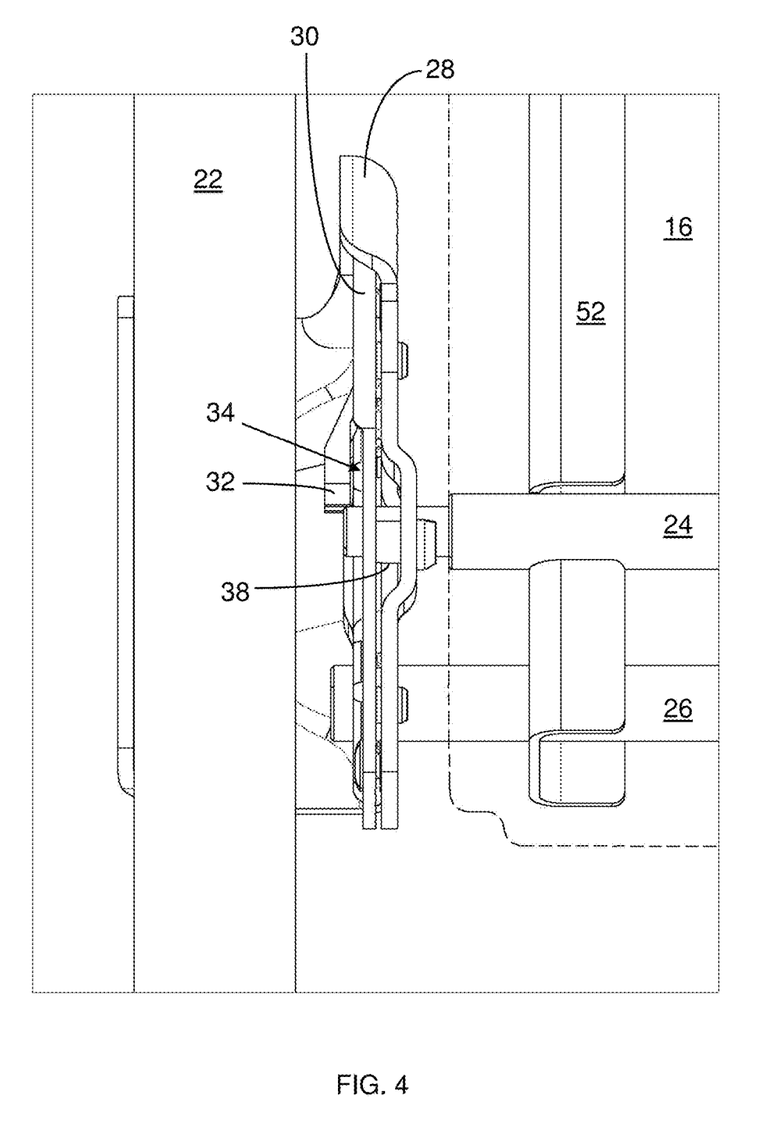
FIG. 4 shows an elevation view of the first side of the mounting assembly.

Referring now to FIGS. 3 and 4, a first side of a assembly, including a first bracket 28 and a first mounting plate 30, is shown on the back frame 22. The first mounting plate 30 has a rod retention tab 32, a keyhole 34, stop rod rotation channel 36, and a pivot cradle 38. The first mounting plate 30 is designed to accommodate the installation and operation of the armrest 16, as will be described in detail below.

Figure 5:
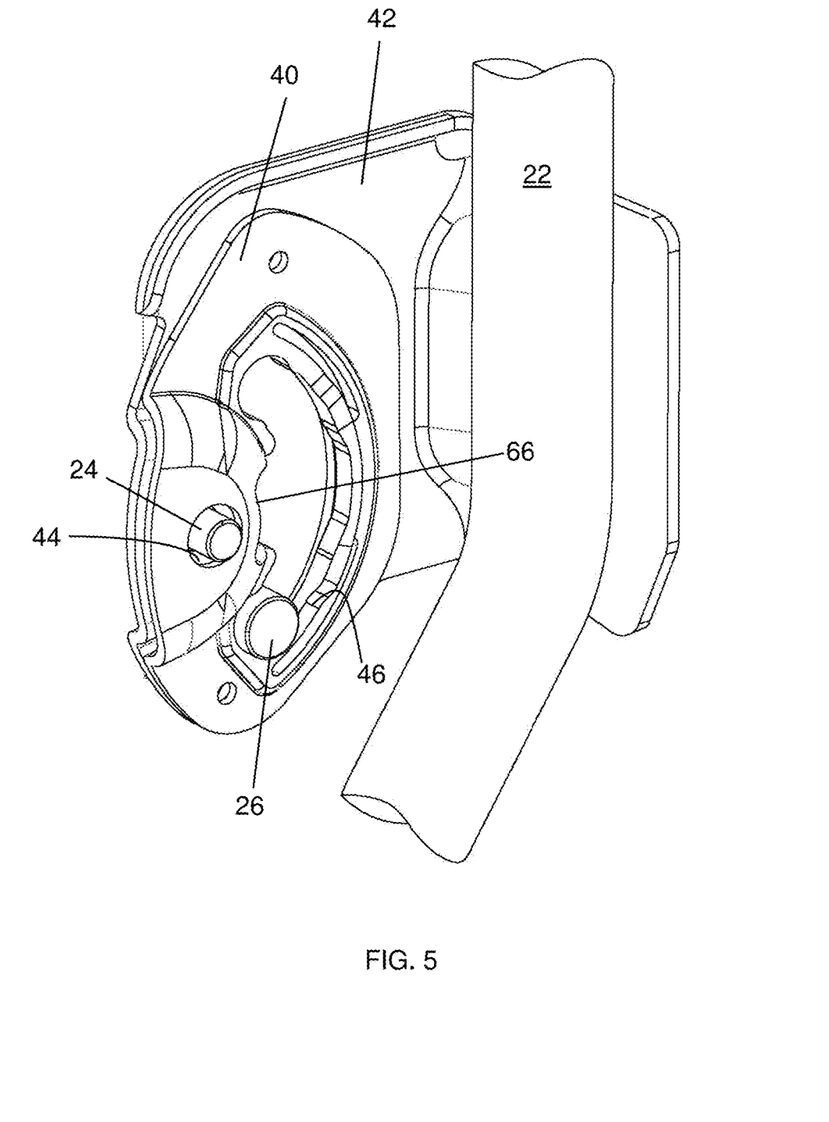
FIG. 5 shows a perspective view of a second side of the mounting assembly.
Figure 6:
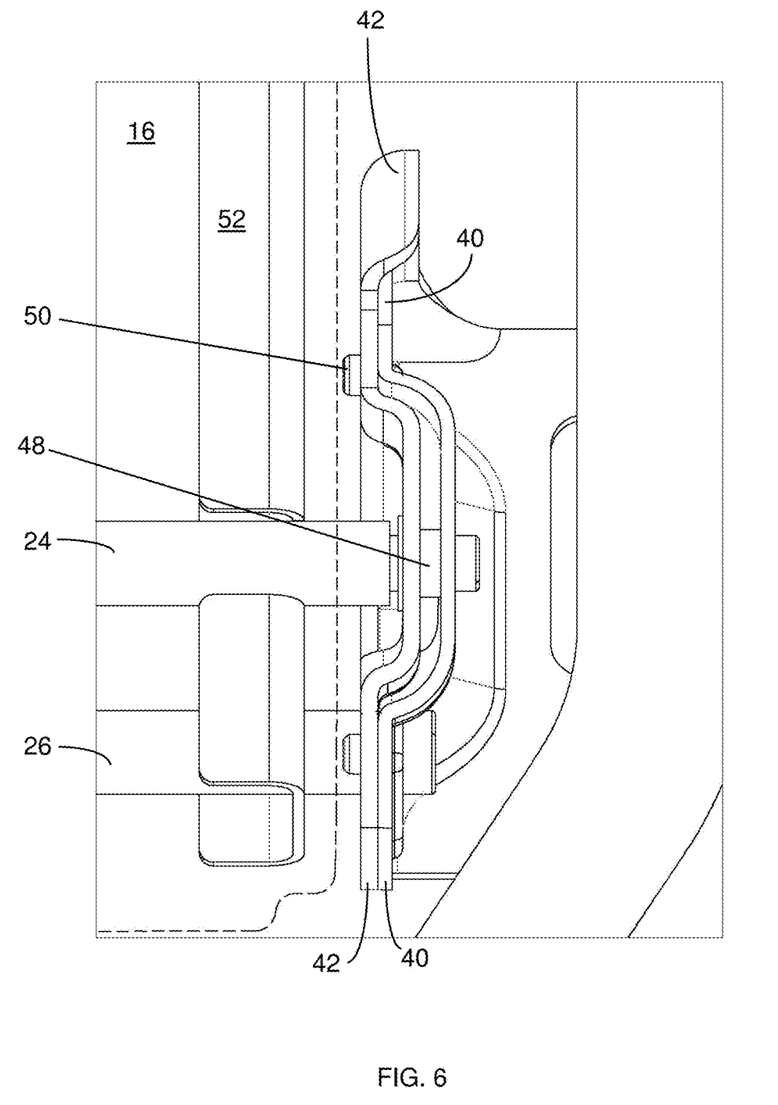
FIG. 6 shows an elevation view of the second side of the mounting assembly.

Referring now to FIGS. 5 and 6, there is shown a second side of the mounting assembly 20, including a second mounting plate 40 supported by a second bracket 42 on the back frame 22. The second mounting plate 40 has a pivot hole 44 and a stop rod rotation channel 46. Additional features, such as one or more bushings 48 may be included in the mounting assembly 20.

As shown in FIGS. 2 through 6, the first bracket 28 and second bracket 42 are attached to the back frame 22 at substantially the same height. In the embodiment shown, the brackets 28, 42 are welded to the back frame 22 and the first and second mounting plates 30, 40 are snapped into the respective brackets using pop rivets as a fastener 50. It should be appreciated that other fastening structures and methods may be used, for example, screws, bolts, rivets, adhesives, clips, clamps, or other connectors. Alternatively, one or both of the first bracket 28 or the second bracket 42 may be an integral part of the back frame 22. Likewise, the first mounting plate 30 may be formed into, or integral to, the first bracket 28; and the second mounting plate 30 may be formed into, or integral to, the second bracket 42.

The mounting assembly 20 includes the first mounting plate 30 on the first bracket 28 and the second mounting plate 40 on the second bracket 42. The first bracket 28 and the second bracket 42 are secured to the back frame 22. The pivot rod 24 and stop rod 26 extend completely through the armrest 16, and through an armrest frame 52, with a portion of the pivot rod 24 and the stop rod 26 projecting from the armrest on either side to engage the mounting assembly 20. The pivot rod 24 and stop rod 26 are configured to support and retain opposite sides of a base portion of the armrest 16 and are configured to define a rotational range of the armrest 16. An axis of rotation of the armrest 16 substantially corresponds to the axis of rotation of the pivot rod, thus, the installed armrest 16 may be pivoted about the pivot rod 24, with a first end of the pivot rod 24 in the pivot cradle 38 of the first mounting plate 30, and a second end of the pivot rod 24 in the pivot hole 44 of the second mounting plate 40. During such pivoting movement, the stop rod 26 travels within the stop rod rotation channels 36, 46. The stop rod rotation channel defines an arc. When the stop rod contacts one end of the arc, the armrest is in a fully lowered or deployed position. When it contacts the other end of the arc the armrest is in a fully raised or stowed position. One or both of the stop rod rotation channels 36, 46 may be sized to frictionally engage the stop rod 26 to restrict unwanted movement of the armrest 16.

Referring now to FIGS. 7 through 10, the operation of the mounting assembly 20 in the installation and retention of the armrest 16 will be described.

The first bracket 28 and the second bracket 42 are secured to the back frame 22 at a substantially level horizontal position. The first mounting plate 30 is snapped onto the first bracket 28 and the second mounting plate 40 is snapped onto the second bracket 42. In the exemplary embodiment, the brackets are steel and the mounting plates are plastic, however other materials may be used. In this embodiment, the mounting plates are attached on the distal side, or outer side, of the brackets from the armrest location. It will be appreciated that the mounting plates may alternately be configured for placement on the proximal or inner side, between the brackets and armrest location.

Figure 7:
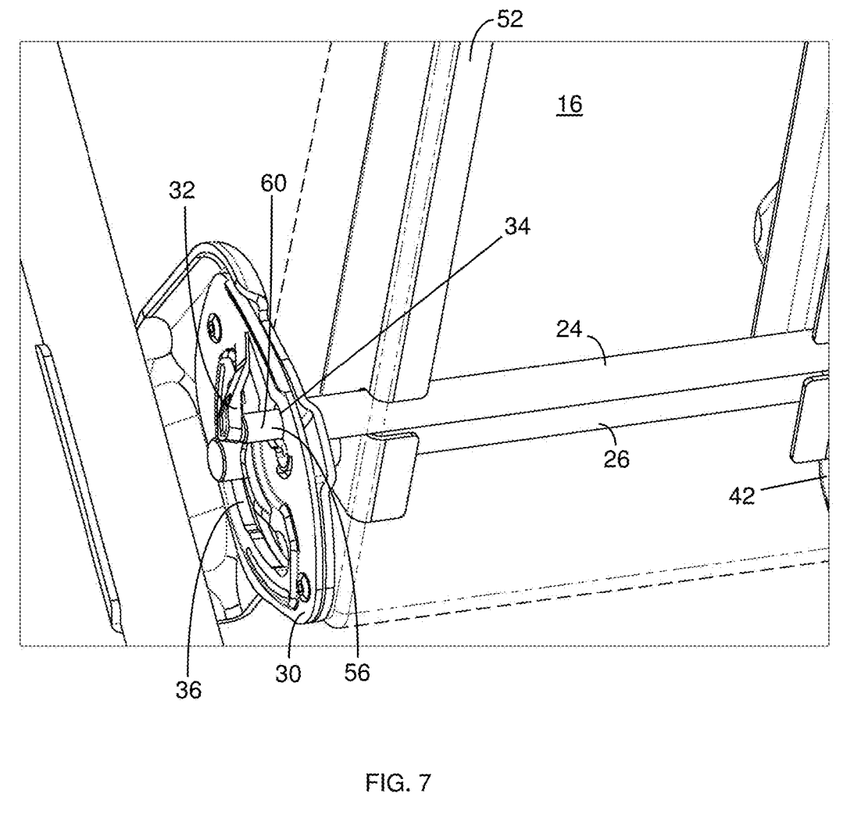
FIG. 7 is a perspective cut-away view of the mounting assembly showing the mounting assembly with the armrest partially installed.

Referring now to FIG. 7, an initial step of installation is inserting a first end 60 of the pivot rod 24 into the keyhole 34 on the first side. The armrest 16, having an armrest frame 52 with a pivot rod 24 and a stop rod 26 extending therethrough, is positioned at an angle to start the armrest installation. The armrest 16 is tilted such that a first end of the stop rod 26 is inserted into the stop rod rotation channel 36 and a first end of the pivot rod 24 is inserted into the wider portion of the key hole 34, as shown in FIG. 7. The retention tab 32 is resilient and is deflected away from the first end of the pivot rod 24.

The end of the pivot rod 24 has a circumferential notch, seating groove, or restriction 56 at a tip where the shape of the pivot rod 24 changes from a body outer dimension to a tip outer dimension. In the illustrated embodiment, the body outer dimension is cylindrical with a first diameter, and the tip outer dimension is cylindrical with a second diameter that is smaller than the first diameter. The body outer dimension is wider than a width of the key hole 34, while the tip outer dimension is narrower than a width of the key hole 34. The sizing aids in guiding positioning during installation. Because the tip on the first side is configured to be inserted into the keyhole 34 on the first mounting plate 30, while the body is not, the length of the tip restriction 56, when inserted into the keyhole 34, increases clearance between the opposite side of the pivot rod 24 and second bracket 42.

Figure 8:
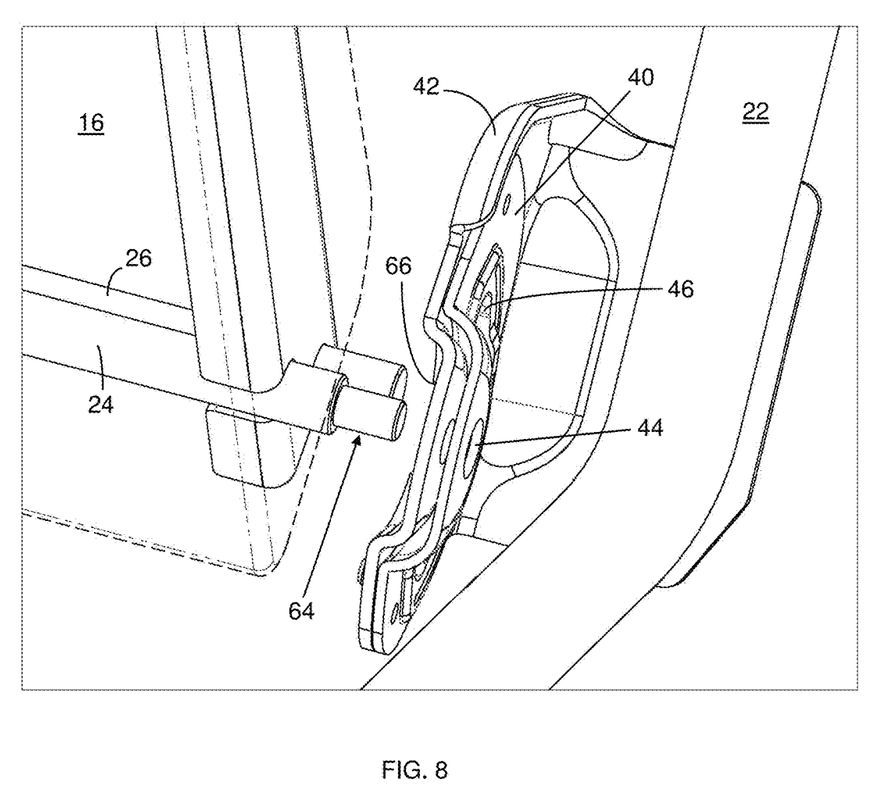
FIG. 8 shows a perspective cut-away view of the mounting assembly during the installation process.

Referring now to FIG. 8, the next step of installation is aligning the second side. While the tip on the first side is inserted into the keyhole 34 on the first mounting plate 30, and the armrest 16 is raised at an angle of about 15 to 45 degrees relative to the back frame, the armrest 16 is canted or tilted toward the first side at an angle of about 1 to 20 degrees from normal, and the second end of the stop rod 26 and the pivot rod 24 second end 64 are moved adjacent to an inner side of the second mounting bracket 40.

Surface features of the second bracket 42 or second mounting plate 40 may be shaped to facilitate or guide installation and positioning. Shaped guide features may include embossing, relief features, ridges, grooves, catches, slopes, smooth and rough surfaces, notches, channels, lips, and flanges, to capture, guide, direct, and align poisoning of the second end of the stop rod 26 and the second end of the pivot rod 24 relative to the second bracket 42 and second mounting plate 40. For example, a forward or upper edge of the second bracket may have a notch 66 to align the pivot rod contact with the second bracket 42 and a proximal inner surface of the bracket may have a groove or recess along a path toward the pivot hole 44. The surface features may guide positioning during installation and may provide haptic feedback to an installer.

Once proximate to the second bracket 42, the armrest 16 is positioned such that the second end of the stop rod 26 and the second end 64 of the pivot rod 24 are aligned respectively with the second stop rod rotation channel 46 and with the pivot hole 44 on the second side. The armrest 16 is positioned so that it is not tilted toward the first or second side, though it may still be angled with respect to the back frame 22.

Figure 9:
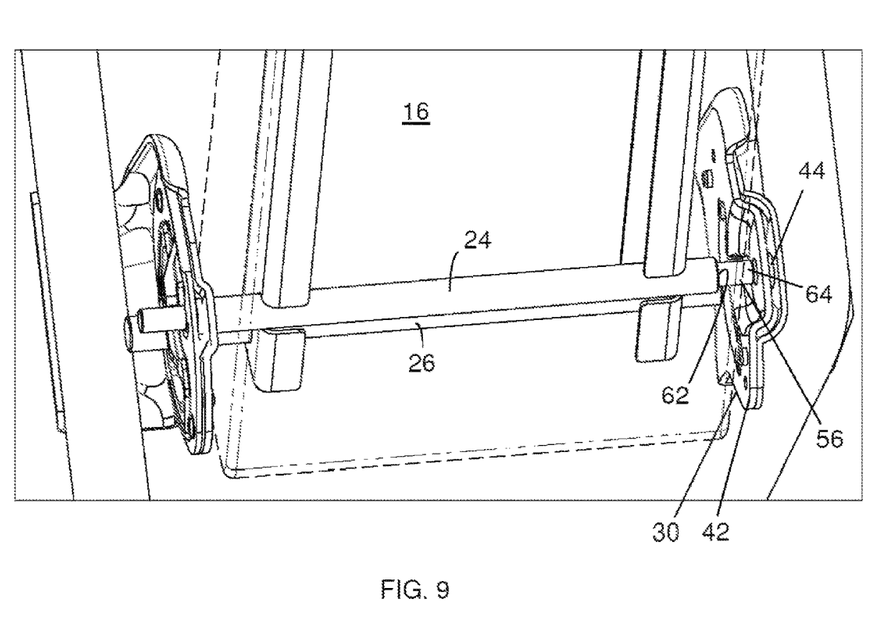
FIG. 9 shows a perspective cut-away view of the mounting assembly during the installation process.

Referring now to FIG. 9, the next step of installation is moving the armrest 16, stop rod 26, and pivot rod 24 laterally toward the second bracket 42. The second end 64 of the pivot rod 24, like the first end, may have a notch, seating groove, or restriction 56 at a tip, in which the tip, but not the body, of the pivot rod 24 seats into the pivot hole 44. Thus, lateral movement is arrested by contact between a shoulder 62 of the pivot rod 24 with the bracket 42 or mounting plate 40 when the tip is fully inserted into the pivot hole 44 because the restriction 56, but not the shoulder 62, is sufficiently narrow to fit into the pivot hole 44.

Figure 10:
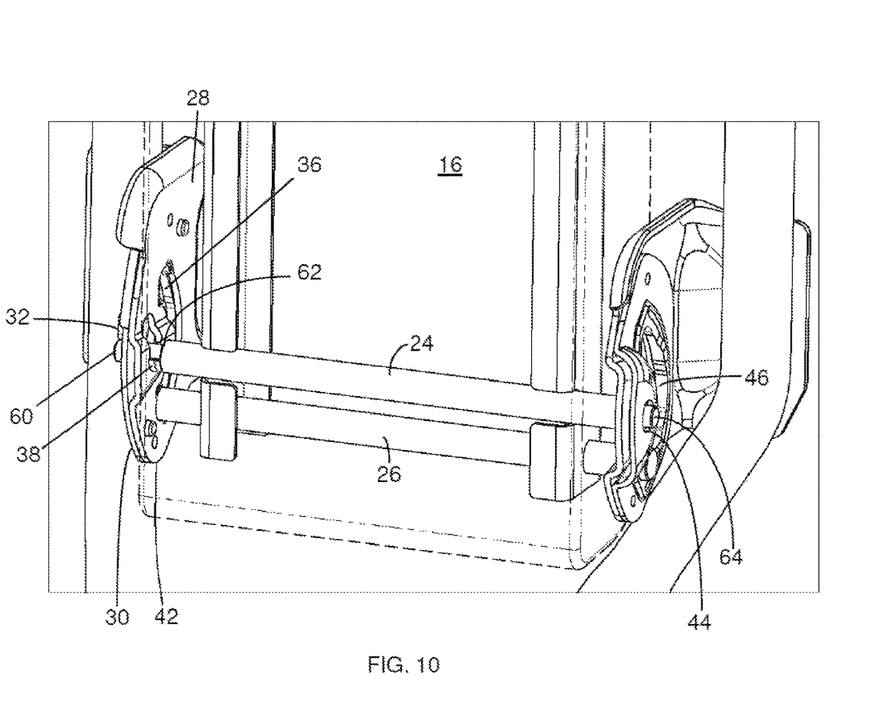
FIG. 10 shows a perspective cut-away view of the mounting assembly during the installation process.

Referring now to FIG. 10, the next step of installation is seating the pivot rod 24 first end 60 seating groove restriction 56 into the pivot cradle 38 of the. The armrest 16 is positioned so that downward pressure can be applied by angling the armrest with respect to the back frame at an acute angle of about 0 to 30 degrees. Downward pressure is applied, moving the tip of the pivot rod 24 from the wider portion of the keyhole 34 downward into the pivot cradle 38. Once the tip of the pivot rod 24 is fully seated in the pivot cradle 38, the retention tab 32 is no longer deflected and restricts the pivot rod 24 from moving out of the pivot cradle 38 to retain the pivot rod in place. The pivot cradle 38 includes a projection that extends laterally to support a substantial portion of the tip of the pivot rod 24 to facilitate smooth and secure rotation of the armrest 16.

When the seating groove restriction 56 of the pivot rod 24 first end 60 is located in the pivot cradle 38, the retention tab 32 is substantially over the tip and the retention tab 32 does not extend laterally substantially past the end of the pivot rod 24. The resilient retention tab 32 is biased toward a retention position and designed to move outward to an installation and release position if pressure is applied onto its inner surface, but not if pressure is applied from below. Thus the seated pivot rod 24 is securely captured in the pivot cradle 38 and the tip of the pivot rod first end 60 is unable to deflect the retention tab 32, so the pivot rod 24 is retained in position relative to the first bracket 28 and first mounting plate 30. Because the pivot rod 24 first end 60 is retained in position laterally and horizontally, the second end 64 of the pivot rod is retained in the pivot hole 44. Because the stop rod 26 is fixed in relation to the pivot rod 24, the stop rod movement is constrained to the stop rod rotation channel 36.

In viewing FIGS. 1-10, it should be appreciated that the described mounting assembly 20 allows the armrest 16 to be mounted relative to the bench seat 10 without the use of tools and without the use of fasteners during the installation. The installer may insert the pivot rod 24 and stop rod 26 into the mounting assembly 20 by hand, and the armrest 16 will be restrained in the installed position.

Beneficial features of the structure and method include embodiments of the invention that are lightweight, durable, efficient to manufacture, and labor-saving to install.

In some embodiments, the length of the stop rod is greater than that of the pivot rod. In some embodiments, the length of the stop rod is greater than that of the pivot rod by 2 to 20 mm, by 5 to 15 mm, or by about 0.5 to 1 cm. In some embodiments, the diameter of the stop rod is greater than that of the pivot rod. In some embodiments, the diameter of the stop rod at the tip is greater than the diameter at the tip of the pivot rod. In some embodiments, the diameter of the pivot rod tip at the seating groove or restriction is 50-90% of the diameter of the pivot rod at the shoulder. In some embodiments, the diameter of the stop rod is greater than that of the pivot hole. The larger diameter and greater length of the stop rod in combination with the embossing and relief features on the brackets and/or mounting plates reduces the risk of errors in installation.

In some embodiments, the first bracket and the second bracket are not mirror images of each other. In some embodiments, the first mounting plate and the second mounting plate are not mirror images of each other. In an embodiment, the first mounting plate has a retention tab and the second mounting plate does not have a retention tab.

In an embodiment, a mounting plate has a height of 6-12 cm, a pivot rod tip has a length of 1-3 cm, a pivot cradle extends laterally for a length of 0.5-2.5 cm, the pivot cradle has a surface area of 1-5 square cm, a retention tab has a length of 1-4 cm, and during installation, the pivot rod tip deflects the retention tab outward from a retention position and to an installation and release position by an angle of between 15-45 degrees, 20-40 degrees, or about 30 degrees.

In some embodiments, a mounting plate can be attached to a bracket at a plurality of height positions. In a method of installing, a first mounting plate is attached to a first bracket, a height is compared with a corresponding second bracket, and an attachment position is selected for the second mounting plate on the second bracket from a plurality of attachment positions having different heights. The selected attachment position may be selected to achieve a level armrest mount position relative to the seat.

In some embodiments, a retention tab is present on both sides of the armrest. In some embodiments, the first bracket and the second bracket are symmetrical mirror images of each other. In some embodiments, the first mounting plate and the second mounting plate are symmetrical mirror images of each other.

In some embodiments one mounting bracket attaches to two points on the frame on either side of the armrest, and has a first attachment side, configured to secure the first mounting plate, and a second attachment side, configured to secure the second mounting plate.

In some embodiments, the pivot rod is not a single contiguous element and comprises a pair of spindle segments aligned on either side of the armrest. The pivot rod or spindle segments may attach to an armrest frame or body. In some embodiments, the stop rod comprises a pair of spindle segments aligned on either side of the armrest.

In some embodiments, a mounting assembly for an armrest includes a pivot rod fixed relative to one of an armrest and a seat frame; a stop rod fixed relative to the pivot rod; a resilient retention tab, mounted relative to the other of an armrest and a seat, the retention tab movable between a retention position in which the retention tab restrains the pivot rod in an installed position, and a release position in which the retention tab does not restrain the pivot shaft in the installed position; a stop rod rotation channel that engages the stop rod when the pivot rod is in the installed position; wherein the armrest may be pivoted relative to the seat between a use position and a stowed position when the pivot rod is in the installed position.

In particular installations and embodiments, the structures of the mounting assembly may be formed of steel, aluminum, copper, metal alloys, plastic, composites, fiber-reinforced composites, or other materials. The structure may be adapted by means known in the art, such as with the use of brackets, braces, extension rods, notches, positioning grooves, levers, washers, gaskets, detent mechanisms, and the like.

While specific examples have been described with particular structures, it is understood that permutations, additions, and substitutions may be made. When a specific material is described in an example, other suitable materials may be used or substituted. For example, when a specific fastener is described, other suitable fasteners or means for attaching and securing may be used including, but not limited to, bolts, screws, rivets, brads, ties, pins, hooks, latches, bands, cables, welding, crimping, binding, adhesives, slots, clips, and clamps. Structures and treatments may be added to the mounting assembly or to the armrest assembly, such as framing, embossing, flanges, notches, positioning grooves, texturing, padding, bolsters, reinforcement, structural ribbing, storage compartments, cup holders, vibrational cushioning, bushings, gaskets, friction coating, paint, or other elements, without deviating from the scope of the disclosure.

Structures may be oriented in different positions to perform an equivalent function, such as reversing elements of mated components. It is to be understood that positional references, such as top, bottom, inner, outer, upper, and lower, are made for ease of explanation and to describe relative position only. Such terms do not limit positional relationships to the vehicle or environment unless stated.

The terms and expressions which have been employed are used as terms of description and not of limitation. Whenever a range is given in the specification, all intermediate ranges and subranges, as well as all individual values included in the ranges given are intended to be included in the disclosure. It should be understood that, although the present invention has been specifically disclosed by particular embodiments and examples, optional features, modification and variation of the concepts herein disclosed may be used by those skilled in the art, and such modifications and variations are considered to be within the scope of the invention as defined by the appended claims.

The principle and mode of operation of this invention have been explained and illustrated in its preferred embodiment. However, it must be understood that this invention may be practiced otherwise than as specifically explained and illustrated without departing from its spirit or scope.

What is claimed is:

1. An armrest mounting assembly for attaching a pivot rod and a stop rod of an armrest to a frame comprising:
    a first mounting plate secured to the frame, having
        a keyhole with a width wider than a first tip of the pivot rod,
        a retention tab adjacent the keyhole and configured to move between a release position and a retention position,
        a pivot cradle at the lower edge of the keyhole configured to engage the pivot rod and permit rotation of the pivot rod relative to the first mounting plate, and
        a stop rod rotation channel configured to engage the stop rod and permit movement of the stop rod along an arc defined by the rotation channel; and
    a second mounting plate secured to the frame, having
        a pivot hole configured to engage a second tip of the pivot rod, and
        a second stop rod rotation channel configured to engage the stop rod.

2. The armrest mounting assembly of claim 1, wherein the first mounting plate is secured to the back frame by a first mounting bracket.

3. The armrest mounting assembly of claim 1, wherein the retention tab is biased toward the retention position.

4. The armrest mounting assembly of claim 1, wherein the retention tab includes a release surface that is shaped so that the pivot rod engages the release surface and applies a force to move the retention tab from the retention position to the release position when the pivot rod passes through the keyhole.

5. The armrest mounting assembly of claim 1, wherein the retention tab is biased toward the retention position, and wherein the retention tab includes a release surface that is shaped so that the pivot rod disengages the release surface and frees the retention tab to move from the release position to the retention position when the pivot rod moves from the keyhole to the pivot cradle.

6. The armrest mounting assembly of claim 1, wherein the retention tab includes a release surface that is shaped so that the pivot rod is unable to apply a force to move the retention tab from the retention position to the release position when the pivot rod is in the pivot cradle.

7. The armrest mounting assembly of claim 1, further comprising a bushing on the second tip of the pivot rod engaging the pivot hole of the second mounting plate.

8. The armrest mounting assembly of claim 1, wherein the stop rod is longer than the pivot rod, and wherein a diameter of the stop rod at an end adjacent the first mounting plate is greater than a diameter of the pivot rod at an end adjacent the first mounting plate.

9. A method of installing an armrest using the armrest mounting assembly of claim 1, comprising:
    deflecting the retention tab to the release position by inserting a first end tip of the pivot rod into the keyhole on the first side and contacting the retention tab with the first end tip;
    inserting a first end of the stop rod into the stop rod rotation channel on the first side;
    moving a second end of the stop rod and a second end of the pivot rod adjacent to an inner side of a second mounting bracket;
    aligning the second end of the stop rod with the second stop rod rotation channel and aligning the second end of the pivot rod with a pivot hole on the second side;
    sliding the armrest, stop rod, and pivot rod, laterally toward the second bracket; and
    seating the first end tip of the pivot rod into the pivot cradle.

10. The method of claim 9,
    wherein the step of moving the second end of the stop rod and the second end of the pivot rod adjacent to the inner side of the second mounting bracket further comprises: angling the armrest at an angle of about 15 to 45 degrees relative to the back frame, and tilting the armrest toward the first side at an angle of about 1 to 20 degrees; and
    wherein the step of aligning the second end of the stop rod with the second stop rod rotation channel and aligning the second end of the pivot rod with the pivot hole on the second side, further comprises straightening the tilting of the armrest to an angle of less than 1 degree.

11. The method of claim 9, wherein the seating step further comprises: exerting downward pressure on the armrest.

12. The method of claim 9, wherein the seating step further comprises: positioning the first end tip of the pivot rod below the retention tab, thereby permitting movement of the retention tab from the release position to the retention position.

13. The method of claim 9, wherein the retention tab moves about 20 to 40 degrees between the retention position and the release position.

14. The method of claim 9, wherein lateral movement of the armrest is bounded on the first side by contact between a shoulder of the pivot rod and the keyhole.

15. The method of claim 9, wherein lateral movement of the armrest is bounded on the second side by contact between a shoulder of the pivot rod and the pivot hole on the second mounting bracket.

16. A seat assembly comprising:
 a back frame;
 an armrest having a pivot rod and a stop rod; and
 an armrest mounting assembly attaching the armrest to the back frame, whereby the armrest pivots relative to the back frame, the armrest mounting assembly comprising:
  a first mounting plate secured to the frame, having
   a keyhole with a width wider than a tip of the pivot rod,
   a retention tab adjacent the keyhole and configured to move between a release position and a retention position,
   a pivot cradle at the lower edge of the keyhole configured to engage the pivot rod and permit rotation of the pivot rod relative to the first mounting plate, and
   a stop rod rotation channel configured to engage the stop rod and permit movement of the stop rod along an arc defined by the rotation channel; and
  a second mounting plate secured to the frame, having
   a pivot hole configured to engage the pivot rod, and
   a second stop rod rotation channel configured to engage the stop rod.

17. The seat assembly of claim 16, wherein the retention tab is biased toward the retention position.

18. The seat assembly of claim 16, wherein the retention tab is configured to move about 30 degrees between the retention position and the release position.

* * * * *